United States Patent [19]

Vilsmeier

[11] Patent Number: 5,529,364
[45] Date of Patent: Jun. 25, 1996

[54] MOTOR VEHICLE SEAT WITH MEANS FOR VERTICAL AND LONGITUDINAL ADJUSTMENT

[76] Inventor: Walter Vilsmeier, Sperlingweg 1, 83558 Maithenbeth, Germany

[21] Appl. No.: 244,429
[22] PCT Filed: Sep. 22, 1993
[86] PCT No.: PCT/EP93/02564
   § 371 Date: May 26, 1994
   § 102(e) Date: May 26, 1994
[87] PCT Pub. No.: WO94/11217
   PCT Pub. Date: May 26, 1994

[30] Foreign Application Priority Data

Nov. 13, 1992 [DE] Germany ............. 42 38 458.3

[51] Int. Cl.⁶ .................................................. B60N 2/04
[52] U.S. Cl. .................. 296/65.1; 248/421; 297/344.15
[58] Field of Search ................. 296/65.1; 297/344.15, 297/344.17, 344.1, 344.13; 248/293, 421

[56] References Cited

U.S. PATENT DOCUMENTS

| 2,942,647 | 6/1960 | Pickles | 155/14 |
| 3,022,035 | 2/1962 | Pickles | 248/395 |
| 3,037,735 | 6/1962 | Matthews | 248/394 |

FOREIGN PATENT DOCUMENTS

| 0445528 | 9/1991 | European Pat. Off. |
| 0445086 | 11/1991 | European Pat. Off. |
| 2195202 | 3/1974 | France |

Primary Examiner—David M. Mitchell
Assistant Examiner—Kia M. Robinson
Attorney, Agent, or Firm—Pollock, Vande Sande & Priddy

[57] ABSTRACT

In a motor vehicle seat with vertical and longitudinal adjustment, a holder (9) is guided by guide rods (7; 8) which can pivot in parallel and are pivotally connected to pivot points (5; 6) which are rigidly fixed to the car body. The holder (9) supports two short guide rods (21; 23), the other ends of which are, in each case, pivotally connected to two further long guide rods (13; 19). The upper ends (12; 25) of the long guide rods (13; 19) are, in turn, pivotally connected to the seat frame (3) and the bottom ends (15; 18) are directed in an upward direction. The short guide rods (21; 23) are pivotally connected between the ends of the long guide rods (13; 19).

11 Claims, 1 Drawing Sheet

MOTOR VEHICLE SEAT WITH MEANS FOR VERTICAL AND LONGITUDINAL ADJUSTMENT

TECHNICAL FIELD

The present invention relates to a motor vehicle seat with means for vertical and longitudinal adjustment.

BACKGROUND ART

Conventional longitudinal adjustment devices of motor vehicle seats are composed of slide rails. Such slide rails have numerous drawbacks. They necessitate a high degree of finishing work. It is also difficult to adhere to the required tolerances.

SUMMARY OF THE INVENTION

The present invention is based on the object of providing a motor vehicle seat of the known type, which permits both a vertical adjustment as well as a longitudinal adjustment using simple means.

This object is achieved by a motor vehicle seat with means for vertical and longitudinal adjustment, in which a holder is guided by guide rods which can pivot in parallel and are pivotally connected to pivot points which are rigidly fixed to the car body, the holder supporting two short guide rods, the other ends of which are, in turn, pivotally connected to the seat frame and the bottom ends are directed in an upward direction, the short guide rods being pivotally connected between the lends of the long guide rods. The short guide rods may be pivotally connected to the center of the long guide rods. The upwardly directed bottom ends of the long guide rods may be guided in an upward direction by means of guide rods which are directed in divergent directions from a common pivot point on the holder. The spacing between the pivot points of the long guide rods on the seat frame conveniently substantially corresponds to the spacing between the pivot points of the short guide rods on the holder. The spacing between the top pivot point of the long guide rods and the pivot point of the short guide rods may be equal to the spacing between the two pivot points on the holder. The bottom hinge points of the long guide rods may be guided at least substantially parallel to each other.

The above device according to the present invention is economical and relatively light-weight, when compared to known adjustment devices.

BRIEF DESCRIPTION OF THE DRAWING

The invention is described hereinafter in detail with reference to the drawing, in which.

DETAILED DESCRIPTION OF THE PREFERRED EMBODIMENT(S)

Figure 1:
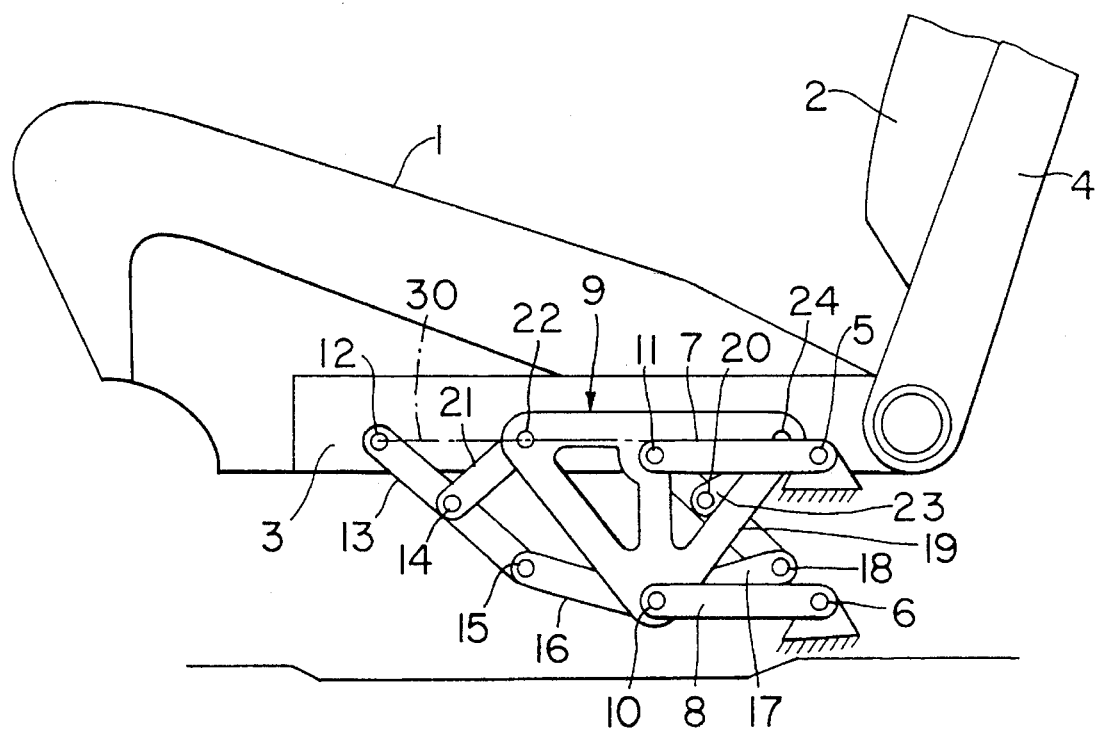
FIG. 1 shows a diagrammatic arrangement of the present invention seat in a forward end position.

Two guide rods 7 and 8 are pivotally connected to two bearing points 5 and 6 which are rigidly fixed to the car body. The front hinge points 10 and 11 of the guide rods 7, 8 support a triangular holder 9. The triangular holder 9 comprises three hinge points 10, 22 and 24 which are arranged in the corners of an isosceles or equal-sided triangle.

Short guide rods 21 and 23 which, in turn, are connected to long guide rods 13 and 19, respectively, via hinge points 14 and 20, project from the hinge points 22 and 24. The upper ends of the long guide rods 13 and 19 are pivotally connected to the hinge points 12 and 25 on the frame 3 of the seat. The seat frame 3 supports the seat upholstery 1. The backrest support 4, comprising the backrest upholstery 2, is pivotally connected to the seat frame 3.

The long guide rods 13 and 19 are directed upwardly from their lower hinge points 15 and 18. In the illustrated exemplified embodiment, the approximate parallel guiding is provided by means of the guide rods 17 and 16 which are pivotally connected to the hinge point 10 of the holder 9.

It is also possible to direct the hinge points 15 and 18 in an upward direction along corresponding optionally linear and parallel or curved and parallel path.

The relevant guide rods for the vertical adjustment are the fixedly hinged guide rods 7 and 8. They transmit their pivoting movement to the holder which, via the guide rods attached thereto, conjointly moves the seat frame in an upward or downward direction.

The functioning of the longitudinal adjustment becomes clear if, in this instance, the holder 9 is visualized in a fixed predetermined position.

Figure 2:
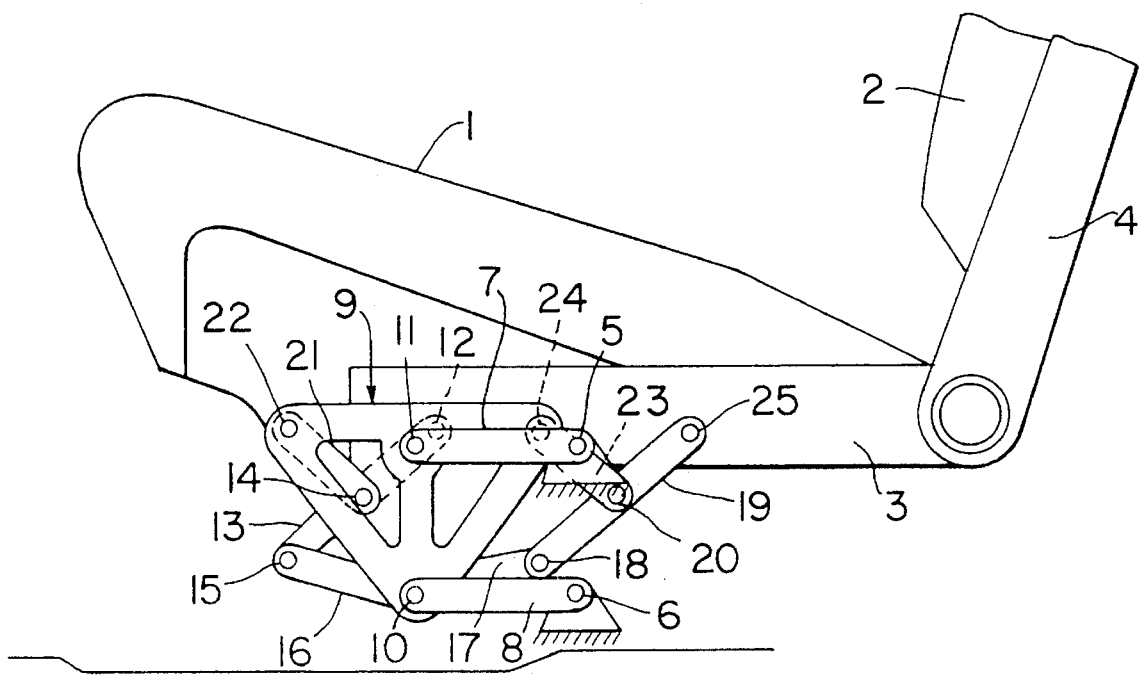
FIG. 2 shows the seat according to FIG. 1 in a rear end position.

The short guide rods 21 and 23 pivot along the indicated circular-arc-shaped pivot path into the position shown in FIG. 2. In so doing, they move the long guide rods 13 and 19 along, into the position illustrated in FIG. 2, with the result that the pivot points 12 and 25 are moved on a virtually linear running track 30. In the course of the described movement, the guide rods 16 and 17, which ensure that the hinge points 15 and 18 are guided substantially parallel, also pivot about their common pivot points 10 on holder 9.

It is possible to provide an additional adjustment of the inclination of the seat frame 3, in that the spacing between the pivot point 11 and the pivot point 5, or the spacing between the hinge points 6 and 10, is provided to be variable.

The above could be provided, for example, by a longitudinally variable design of the guide rod 7 or 8.

A relocation of the spacing of the pivot points 11 and 5 or 10 and 6 is also possible if a crankshaft is supported in points 10 and/or 11, the bearing journal of which crankshaft is arranged at points 10 and/or 11 and the crank pin of which supports the end of the guide rods 7 or 8, respectively. A rotation of the crankshaft or of the crank brings about changes in the spacing between the pivot points 11 and 5 or 10 and 6, respectively.

The guide rods linkage illustrated on the left-hand side of the seat in the Figures of the drawing is provided, with an identical design and arrangement, in each case, on the right-hand side of the seat.

I claim:

1. Motor vehicle seat with means for vertical and longitudinal adjustment, comprising
    a holder which is guided by guide rods pivotable in parallel;
    guide rod pivot points rotational supporting said guide rods, said guide rods pivots points being rigidly fixed to a car body;
    two short guide rods having first and second ends, the first end being supported by said holder;
    two long guide rods having upper and lower ends, said long guide rods being pivotally connected to the second ends of said two short guide rods between the ends of said long guide rods, the lower ends being directed in an upward direction; and a seat frame pivotally connected to the upper ends of said long guide rods.

2. Motor vehicle seat according to claim 1, wherein the short guide rods are pivotally connected to the center of the long guide rods.

3. Motor vehicle seat according to claim 1 further comprising directing guide rods, extending in divergent directions from a common pivot point on the holder, upwardly directed lower ends of said long guide rods in an upward direction.

4. Motor vehicle seat according to claim 1 wherein spacing between said upper ends of said long guide rods connected to the seat frame substantially corresponds to spacing between pivot points located where the short guide rods connect to the holder.

5. Motor vehicle seat according to claim 1 wherein the spacing between a pivotal connection at the upper ends of the long guide rods and a point at which the second ends of said two short guide rods are connected to said long guide rods is equal to the spacing between pivot points at each end of said two short guide rods.

6. Motor vehicle seat according to claim 1 wherein the lower ends of the long guide rods are guided at least substantially parallel to each other.

7. Motor vehicle seat according to claim 2 further comprising directing guide rods, extending in divergent directions from a common pivot point on the holder, upwardly directed lower ends of said long guide rods.

8. Motor vehicle seat according to claim 2 wherein spacing between said upper ends of said long guide rods connected to the seat frame substantially corresponds to spacing between pivot points located where the short guide rods connect to the holder.

9. Motor vehicle seat according to claim 3 wherein the spacing between pivotal connections at upper ends of the long guide rods on the seat frame substantially corresponds to the spacing between pivot points where the holder supports the first ends of the two short guide rods.

10. Motor vehicle seat according to claim 4 wherein the spacing between a pivotal connection at the upper ends of the long guide rods and a point at which the second ends of said two short guide rods are connected to said long guide rods is equal to the spacing between pivot points at each end of said two short guide rods.

11. Motor vehicle seat according to claim 5 wherein the lower ends of the long guide rods are guided at least substantially parallel to each other.

* * * * *

UNITED STATES PATENT AND TRADEMARK OFFICE
CERTIFICATE OF CORRECTION

PATENT NO. :   5,529,364
DATED      :   June 25, 1996
INVENTOR(S):   Walter Vilsmeier It is certified that error appears in the above-identified patent and that said Letters Patent is hereby corrected as shown below:

```
Column 2
Claim 1, line 5, delete "rotational" and insert --
rotationally --; line 6, delete "rods pivots" and insert
-- rod pivot --.
Column 3
Claim 3, lines 3-5, delete "upwardly directed lower ends...
in an upward direction".
Column 4
Claim 7, lines 3-4, delete "upwardly directed... guide rods".
```

Signed and Sealed this

Twenty-fourth Day of September, 1996

Attest:

BRUCE LEHMAN

*Attesting Officer*     *Commissioner of Patents and Trademarks*